UNITED STATES PATENT OFFICE.

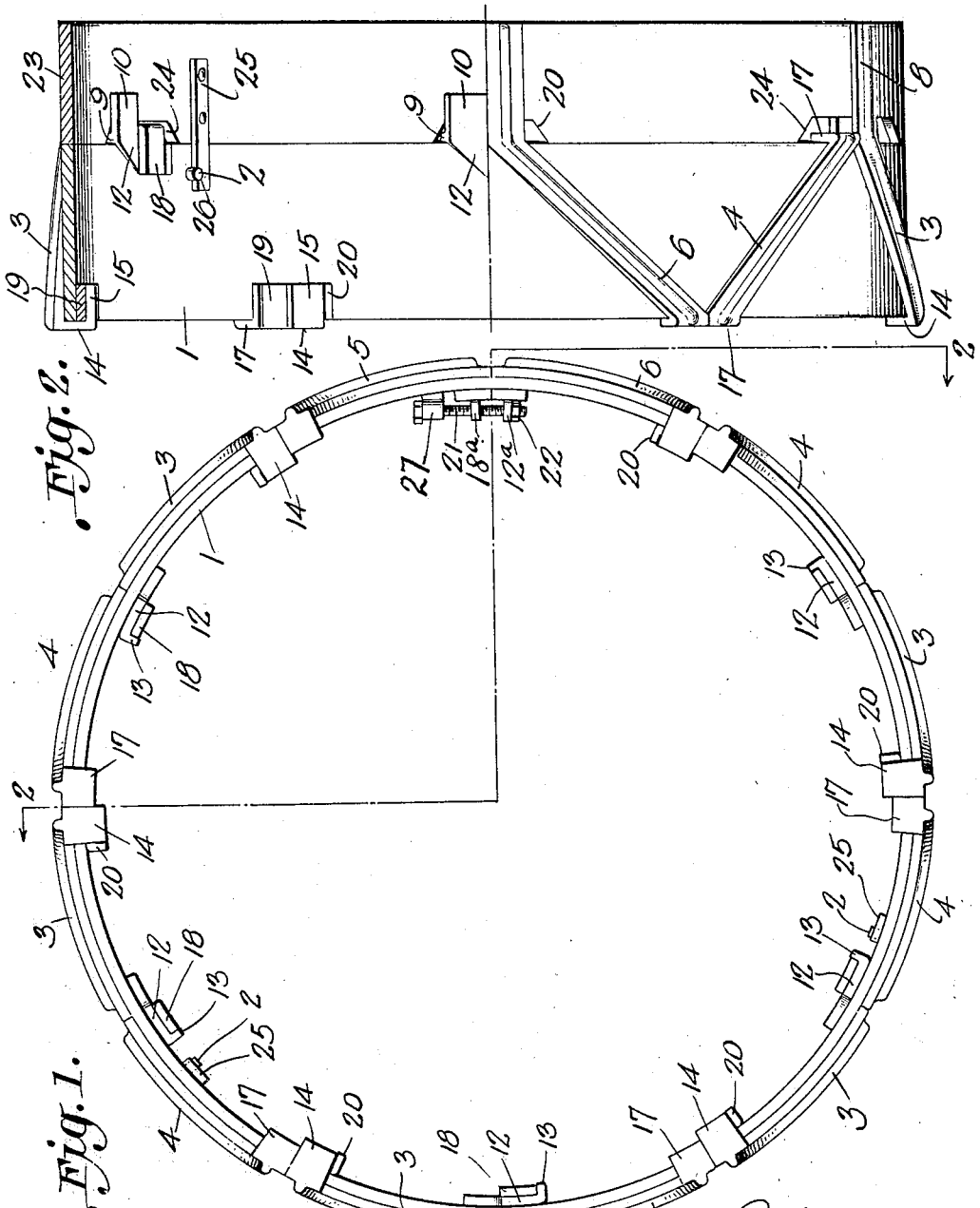

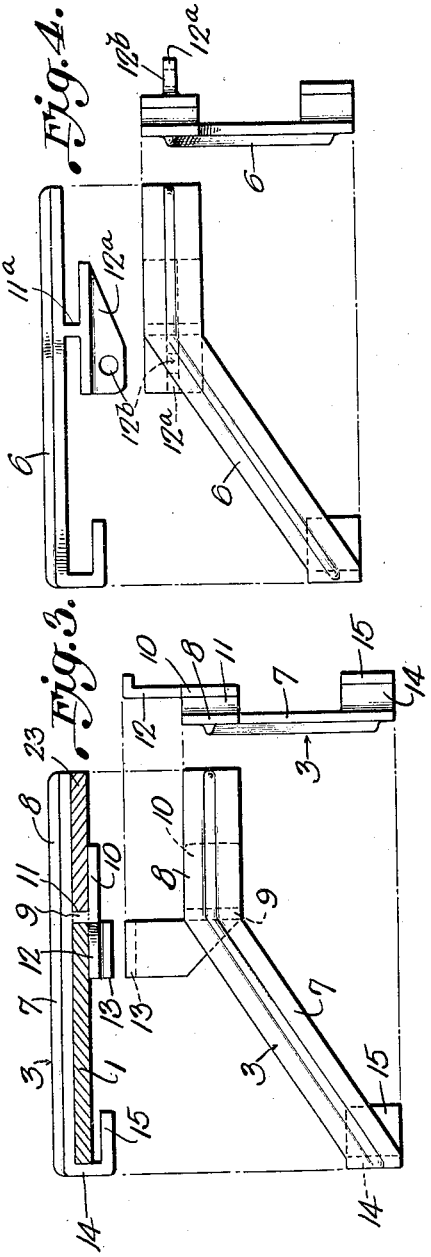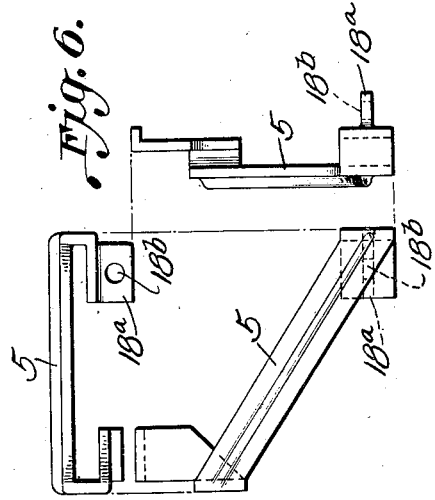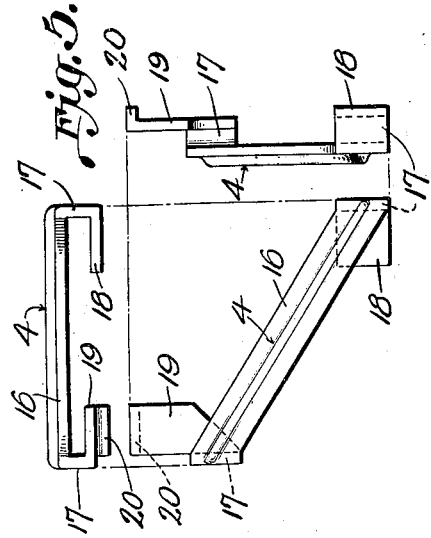

JOHN A. BENTZ, OF HARRISBURG, PENNSYLVANIA, ASSIGNOR OF ONE-HALF TO WALTER S. SCHELL AND ONE-HALF TO BESSIE M. BENTZ, BOTH OF HARRISBURG, PENNSYLVANIA.

TRACTION DEVICE FOR WHEELS.

1,369,956.   Specification of Letters Patent.   Patented Mar. 1, 1921.

Application filed April 9, 1920. Serial No. 372,587.

*To all whom it may concern:*

Be it known that I, JOHN A. BENTZ, a citizen of the United States, residing at Harrisburg, in the county of Dauphin and State of Pennsylvania, have invented certain new and useful Improvements in Traction Devices for Wheels; and I do hereby declare the following to be a full, clear, and exact description of the invention, such as will enable others skilled in the art to which it appertains to make and use the same.

This invention relates to improvements in wheels and more particularly to traction means for use with the wheels of traction engines or motor agricultural implements. One of the objects of the invention is to provide means for widening the wheel tread and means for supporting the widening means and preventing the same from moving toward the axis of the wheel. Supplementary rims for widening wheel treads have been used prior to the present time but in all known prior constructions a great number of parts are necessary for use in attaching the widening means to the ordinary rim and the widening means may shift circumferentially. With my construction the widening means, which is in the form of an auxiliary rim, may be quickly and easily attached with the use of a single bolt only.

Another object of the invention is to provide improved traction lugs which form traction means for the wheel rim and also for the auxiliary rim and these lugs are so constructed that weight placed upon the auxiliary rim will be borne by the traction lugs and the main rim. I have a prior application for patent Serial No. 350,852 filed Jan. 12, 1920 in which I disclose traction lugs similar to but not identical with the lugs of the present application.

Another object of the present invention is to provide traction lugs each of which detachably interlocks with the main rim and each of which has its ends detachably connected to adjacent lugs, the construction being such that the lugs may be arranged around the periphery of the rim and the entire series of lugs be locked to the wheel by a single fastening means such as a bolt and nut.

A still further object of the present invention is to provide certain of the lugs with recessed portions which receive the auxiliary rim and function to transfer strains upon the auxiliary rim, to the main rim.

With the foregoing objects outlined and with other objects in view which will appear as the description proceeds, the invention consists in the novel features hereinafter described in detail, illustrated in the accompanying drawings and more particularly pointed out in the appended claims.

Referring to the drawings:—

Figure 1 is a side view of a wheel rim with my improved traction lugs and auxiliary rim attached thereto.

Fig. 2 is an edge view of the wheel with a portion broken away or in section, said section being taken on the line 2—2 of Fig. 1.

Fig. 3 shows respectively a side view, a top plan view and an end view of one form of an intermediate traction lug.

Fig. 4 shows similar views of a similar end lug.

Fig. 5 shows respectively a side view, a top plan view and an end view of a different form of intermediate lug.

Fig. 6 shows similar views of another form of end lug.

In the drawings 1 represents a wheel rim of ordinary construction and to adapt the same for the purposes of this invention, it is only necessary to provide the same with a plurality of inwardly extending radial pins 2. In the construction shown I have illustrated two of these pins, but it will be understood that this number may be varied where necessary or desired.

Extending around the periphery of the rim is a series of traction lugs 3 and 4 which interlock with the wheel rim and with each other and the ends of the series are connected together by end lugs 5 and 6.

As best seen from Fig. 3 each of the lugs 3 consists of a bar 7 provided at one end with an extension 8 which is arranged at an angle relatively to the longitudinal axis of the bar 7. A lug 9 extends from the underside of the member 3 and carries an extension 10, which extends beneath and parallel to the part 8 to form a recess or channel 11. The member 9 also supports a projection 12 which extends at right angles to the members 8 and 10 and is provided at one end with a downwardly extending lug 13. The end of the member 7 opposite that carrying the depending portion 9, is provided with downwardly extending member 14, which carries an inwardly projecting flange 15 which is arranged at an angle relatively to the longitudinal axis of the part 7. The form of lug which has just been specifically described, is one of the intermediate lugs forming a unit in the series which extend around the wheel and the other form of intermediate lug will now be described.

Referring to Fig. 5, 16 represents the traction member of the lug 4 which has its ends bent downwardly, as shown at 17 and extended inwardly to provide flanges 18 and 19. Both of these flanges are arranged at angles relatively to the longitudinal axis of the part 16 but the member 19 extends at right angles to the member 18 and is provided at one end with a downwardly projecting extension 20 for a purpose hereinafter described.

In placing the lugs shown in Figs. 3 and 5 on the wheel rim, the portions 7 and 16 are first placed parallel with the axis of the rim and they are then turned until the members 12 and 15 of the part 7 lock beneath the edges of the rim 1 and the parts 18 and 19 of the member 16, also lock beneath the edges of the rim. Assuming that the member 3 is first placed on the rim, then the member 4 will be placed on the rim adjacent to the same and the portion 18 will be slipped beneath the part 12 and the lug 13 of said part 12 will interlock the adjacent ends of the members 3 and 4 together. After this a second link or unit like that of Fig. 3, will be placed on the rim and the part 15 of the member 3 will be slipped beneath the part 19 and the lug 20 will lock the last two units together. Then both forms of the intermediate lugs will be alternately added to the traction series until the ends are reached and, as before stated, the ends of the series will be connected by the lugs shown in Figs. 4 and 6.

The lug shown in Fig. 4 is similar to that shown and described in connection with Fig. 3 with the exception that the member 12 is substituted by a downwardly extending flange 12ª having an aperture 12ᵇ. The lug shown in Fig. 6 is the same in construction as that disclosed in Fig. 5, with the exception that the member 17 is provided with an inwardly extending flange 18ª having an aperture 18ᵇ.

When the end lugs shown in Figs. 4 and 6 are attached to the ends of the series of intermediate lugs, the members 12ª and 18ª will be arranged adjacent to each other and a bolt 21 will be passed through the apertures 12ᵇ and 18ᵇ of these parts and a nut 22 may be placed on the bolt for holding the end lugs together.

From the foregoing, it will be seen that each lug interlocks with the wheel rim 1 and that its ends are detachably interlocked with adjacent lugs, and that a single bolt only is required to lock the entire series of lugs upon the wheel rim.

The recessed portions 11 and 11ª of the lugs 3 and 6 form a seat for an auxiliary rim 23 which has its inner edge cut away at 24 to accommodate the interlocking members of the lugs at one edge of the wheel rim and the auxiliary rim is provided with locking members 25 which are recessed at 26 to detachably engage the pins 2. The auxiliary rim also has an inwardly projecting apertured member 27 through which the bolt 21 passes for securing the auxiliary rim in position.

When it is desired to add the auxiliary rim 23 to a wheel provided with the improved traction means, the auxiliary rim is placed co-axial with the rim 1 and the auxiliary rim is moved axially until it is lodged within the recesses 11 and 11ª, then the auxiliary rim is moved circumferentially relatively to the rim 1 until the recesses 26 engage the pins 2. At this time the member 27 will lie adjacent to the parts 12ª and 18ª and the bolt 21 may be passed through the parts 18ª, 12ª and 27 to lock the series of traction lugs upon the wheel rim and the auxiliary rim to said wheel rim. It will therefore be seen that the single bolt 21, in my construction, performs a dual function and enables the lugs and auxiliary rim to be quickly and easily attached or detached.

In Figs. 3, 4, 5 and 6 I have shown the undersides of the traction lugs as straight, but this I have done for the purpose of illustration, as in actual practice the undersides of the lugs will be curved to conform to the periphery of the rim, as shown in Figs. 1 and 2.

It has heretofore been proposed to provide detachable traction lugs for wheel rims and in some instances certain of the traction lugs have been provided with means for interlocking with the edges of the wheel rim, but in such instance, all of the lugs of the series do not interlock with the edges of the wheel rim. In this prior construction every other lug of the series interlocks with the rim and alternate lugs interlock with the other lugs only. This known construction places traction strains of certain of the lugs on the other lugs, while by my construction all of these strains are borne directly by the wheel rim.

It will also be seen that the strains placed upon the auxiliary rim in my construction are transferred through the lugs to the main rim and this is an advantage which will be appreciated by those skilled in the art.

When traveling with a traction engine or motor tractor, over State roads or the like, the wheels of the vehicle may be used without my attachments and when the field or place of work is reached, the traction lugs may be speedily applied. If the ground on which the vehicle is working, is particularly soft or marshy, the auxiliary rim may also be applied.

I am aware that various changes and modifications may be made in the construction shown, without departing from the spirit of the invention, as set forth in the following claims.

What I claim and desire to secure by Letters Patent is:—

1. The combination with a wheel rim, of a series of traction lugs extending around the periphery of the same, each provided with means interlocking with the edge of the rim, each of said lugs having its ends detachably interlocking with the ends of adjacent lugs, recessed portions carried by certain of the lugs, and an auxiliary rim engaging the recessed portions of said lugs one of said rims being provided with projecting pins and the other rim being provided with recessed members which engage said pins.

2. The combination with a wheel rim, of a series of traction lugs extending around the periphery of the same, each provided with means interlocking with the edge of the rim, each of said lugs having its ends detachably interlocking with the ends of adjacent lugs, recessed portions carried by certain of the lugs, and an auxiliary rim engaging the recessed portions of said lugs, the auxiliary rim being provided with members extending parallel to the axis of the auxiliary rim and having recessed portions, and radially extending pins carried by the wheel rim and detachably engaging the recessed portions of the auxiliary rim members.

3. The combination with a wheel rim having recessed members extending laterally therefrom, and an auxiliary rim coaxial with the wheel rim and having a portion resting in the recesses of said members, one of said rims being provided with projecting pins and the other of said rims being provided with recessed members which engage said pins.

4. The combination with a wheel rim having recessed members extending laterally therefrom, and an auxiliary rim coaxial with the wheel rim and having a portion resting in the recesses of said members, the wheel rim being provided with projecting pins and the auxiliary rim being provided with recessed members which detachably interlock with said pins.

5. The combination with a wheel rim, of a series of traction lugs extending around the periphery of the same and detachably engaging said rim, a single fastening means for securing the series of lugs upon the rim, an auxiliary rim, means for connecting the auxiliary rim to the wheel rim, and a member connected to the auxiliary rim and engaging said fastening means for locking the auxiliary rim to the wheel rim.

6. The combination with a wheel rim, of a series of traction lugs extending around the periphery of the same, each of said lugs extending diagonally across the periphery of the rim and adjacent lugs being arranged at angles to each other, flanges provided at the ends of the lugs extending beneath the rim, means detachably connecting the ends of each lug to the ends of adjacent lugs, recessed portions provided upon certain of the lugs, an auxiliary rim resting in said recesses, a single locking means connecting the end lugs of the series and means connecting the auxiliary rim to the single locking means, whereby all of said lugs and said auxiliary rim are held in position by said single locking means.

7. The combination with a wheel rim, of a series of traction lugs extending around the periphery of the same, certain of said lugs being provided with projecting portions extending parallel to the axis of the rim and beyond one edge of said rim, recesses provided in the extending portions of said lugs and an auxiliary rim resting in said recesses, the auxiliary rim being provided with recessed members and the wheel rim being provided with pins which are engaged by the recessed members of the auxiliary rim.

8. The combination with a wheel rim, of a series of traction lugs extending around the periphery of the same, certain of said lugs being provided with projecting portions extending parallel to the axis of the rim and beyond one edge of said rim, recesses provided in the extending portions of said lugs and an auxiliary rim resting in said recesses, the end lugs of the series being connected by a single bolt and the auxiliary rim having means engaging said bolt.

In testimony whereof I affix my signature.

JOHN A. BENTZ.